United States Patent
Kuhar

(10) Patent No.: US 8,837,157 B2
(45) Date of Patent: Sep. 16, 2014

(54) SYSTEM FOR INTERCONNECTING ELECTRICAL COMPONENTS

(75) Inventor: Edward C. Kuhar, Concord, OH (US)

(73) Assignee: Cisco Technology, Inc., San Jose, CA (US)

(*) Notice: Subject to any disclaimer, the term of this patent is extended or adjusted under 35 U.S.C. 154(b) by 449 days.

(21) Appl. No.: 13/247,229

(22) Filed: Sep. 28, 2011

(65) Prior Publication Data

US 2013/0077271 A1 Mar. 28, 2013

(51) Int. Cl.
*H05K 5/00* (2006.01)

(52) U.S. Cl.
USPC .................................................. 361/759

(58) Field of Classification Search
USPC .................................................. 361/759
See application file for complete search history.

(56) References Cited

U.S. PATENT DOCUMENTS

| | | | |
|---|---|---|---|
| 5,334,029 A * | 8/1994 | Akkapeddi et al. ............. | 439/66 |
| 6,088,232 A * | 7/2000 | Ho ................................ | 361/754 |
| 6,166,920 A * | 12/2000 | Schweers et al. ............. | 361/801 |
| 6,223,053 B1 | 4/2001 | Friedmann et al. ........... | 455/552 |
| 6,424,537 B1 * | 7/2002 | Paquin et al. ................. | 361/752 |
| 6,813,165 B2 * | 11/2004 | Cheng et al. .................. | 361/801 |
| 7,119,744 B2 | 10/2006 | Theobold et al. ............. | 343/700 |
| 7,589,435 B2 | 9/2009 | Metsker et al. ................ | 307/32 |
| 7,599,195 B2 * | 10/2009 | Chen ............................ | 361/810 |
| 8,000,111 B2 * | 8/2011 | Liao ............................. | 361/807 |
| 8,054,640 B2 * | 11/2011 | Monda et al. ................. | 361/752 |
| 2006/0077640 A1 * | 4/2006 | Yoshikawa et al. ........... | 361/752 |
| 2011/0019582 A1 | 1/2011 | Okmyanskiy et al. ........ | 370/254 |

* cited by examiner

*Primary Examiner* — Forrest M Phillips
(74) *Attorney, Agent, or Firm* — Brinks Gilson & Lione

(57) ABSTRACT

In one embodiment, an apparatus includes a housing with a conductive surface. A circuit board may be positioned within the housing. The circuit board includes a deflectable portion that may be movable relative to the housing. A conductive pad is positioned on the deflectable portion of the circuit board. A spring member is positioned between the housing and the circuit board. The spring member may be movable between a first configuration and a second configuration. The conductive pad of the circuit board may be spaced away from the conductive surface of the housing by the spring member in the first configuration and in contact with the conductive surface of the housing with the spring member in the second configuration.

20 Claims, 10 Drawing Sheets

SYSTEM FOR INTERCONNECTING ELECTRICAL COMPONENTS

FIELD

The present embodiments relate to a system for interconnecting electrical components.

BACKGROUND

Electrical components often include connectors that enable one electrical component to be coupled to another electrical component. Once coupled, various signals may be passed between the two electrical components via the connectors. For example, data may be transmitted by one electrical component for receipt by the other electrical component. Power also may be supplied by one electrical component to power the other electrical component.

The connectors may be configured as board to board or hard pin connectors. Such a connector may include a housing and a series of terminals, each connected to a printed circuit board. Data and/or power signals may be transmitted between the connected circuit boards through the terminals of the connectors.

DETAILED DESCRIPTION OF THE DRAWINGS

Overview

Figure 1:
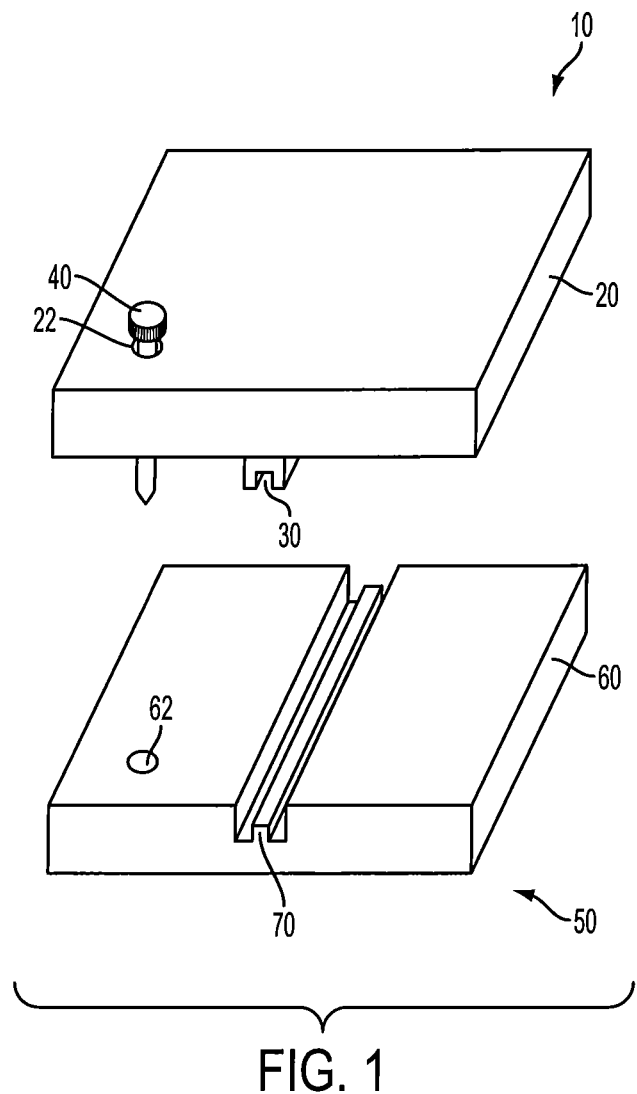
FIG. 1 illustrates a perspective view of one embodiment of a first electrical component aligned with one embodiment of a second electrical component.

In one embodiment, an apparatus includes a housing with a conductive surface. A circuit board may be positioned within the housing. The circuit board includes a deflectable portion that may be movable relative to the housing. A conductive pad is positioned on the deflectable portion of the circuit board. A spring member is positioned between the housing and the circuit board. The spring member may be movable between a first configuration and a second configuration. The conductive pad of the circuit board may be spaced away from the conductive surface of the housing by the spring member in the first configuration and in contact with the conductive surface of the housing with the spring member in the second configuration.

In another embodiment, a system can include a first electrical component including a first housing having a conductive surface. An opening may be formed in the first housing. The first electrical component also may include a first connector. A circuit board may be positioned within the first housing of the first electrical component. The circuit board may include a conductive pad. A spring member may be positioned between the first housing and the circuit board. The spring member may be movable between a first configuration and a second configuration. The conductive pad of the circuit board and the conductive surface of the first housing may be spaced from one another by the spring member in the first configuration and in contact with one another with the spring member in the second configuration. The system also may include a second electrical component including a second housing with an opening formed therein. The second electrical component also may include a second connector. The first housing and the second housing may be structured and arranged such that, with the first and second connectors engaged with one another, the opening of the first housing is aligned with the opening of the second housing. The system also may include a fastener extending through the opening of the first housing and movable into an engaged position in which a portion of the fastener is engaged with the opening of the second housing to move the spring member into the second configuration In yet another embodiment, a method can include electrically coupling a first electrical component to a second electrical component by engaging a first connector of the first electrical component with a second connector of the second electrical component. During electrical coupling, each of the first and second connectors may be deenergized. The method also may include energizing at least one of the first and second connectors subsequent to electrically coupling the first and second electrical components. Energizing at least one of the connectors may include moving a spring member of the first electrical component between a first configuration and a second configuration. The spring member may be positioned between a circuit board of the first electrical component and a housing of the first electrical component. A conductive pad of the circuit board and a conductive surface of the housing may be spaced from one another with the spring member in the first configuration and in contact with one another with the spring member in the second configuration.

Example Embodiments

Figure 2:
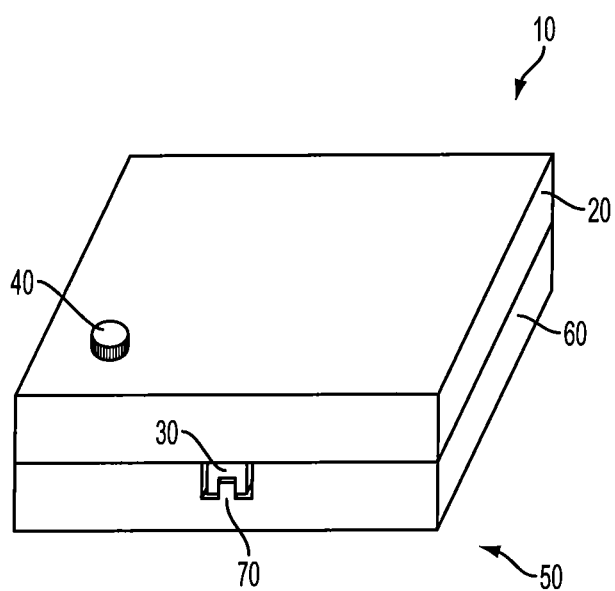
FIG. 2 illustrates a perspective view of the first electrical component of FIG. 1 coupled with the second electrical component of FIG. 1.

FIGS. 1-2 illustrate one example of the interconnection between a first electrical component 10 and a second electrical component 50. The first electrical component 10 may include a housing 20. A first electronics (not shown), such as a circuit board, may be positioned within the housing 20. The first electrical component 10 also may include a first connector 30. The first connector 30 may be configured to transmit data and/or power signals between the first electrical component 10 and the second electrical component 50. Similarly, the second electrical component 50 may include a housing 60 with a second electronics (not shown), such as a circuit board, positioned within the housing. The second electrical component 50 also may include a second connector 70 which may be configured to transmit data and/or power signals between the second electrical component 50 and the first electrical component 10. In other examples any number of connectors may be included.

The connectors may be configured as any type of electrical connectors capable of transmitting data and/or power signals including, without limitation, board to board connectors, hard pin connectors, or ribbon cables. In one example, each of the connectors 30, 70 may include a connector housing and a series of terminals. Each terminal of the first connector 30 may be connected to the first electronics of the first electrical component 10. Each terminal of the second connector 70 may be connected to the second electronics of the second electrical component 50. The first connector 30 may be configured to engage the second connector 70 or vice versa. For example, the connector housing of the second connector 70 may be received within the connector housing of the first connector 30, as shown in FIG. 2, such that one or more terminals of the second connector are engaged with a corresponding one or more terminals of the first connector. In this manner, the first and second electrical components 10, 50 may be electrically coupled to one another. Once electrically coupled, data and/or power signals may be transmitted through the terminals of the first connector 30 of the first electrical component 10 and the second connector 70 of the second electrical component 20. Data may be passed between the first and second electrical components 10, 50 via these signals. Power also may be supplied from one of the first and second electrical components 10, 50 to the other via these signals.

The first electrical component 10 and the second electrical component 20 also may be mechanically coupled to one another. For example a first opening 22 may be formed in the housing 20 of the first electrical component 10. A second opening 62 may be formed in the housing 60 of the second electrical component 50. The first and second openings 22, 62 may be arranged with respect to the connectors such that, upon engagement between the first connector 30 and the second connector 70, the first and second openings are generally aligned with one another. The first opening 22 may extend entirely through the first electrical component to receive a fastener 40. The fastener 40 may extend within the first opening 22 through the first electrical component 10 and into the second opening 62 of the second electrical component 50.

In one example, the fastener 40 may include a head portion and a threaded shaft portion. The second opening 62 of the second electrical component 50 also may be threaded to engage the threads of the fastener 40. The fastener 40 may be rotated within the second opening 62 of the second electrical component 50 (i.e., threaded in to the second electrical component) to draw the head of the fastener closer to the second electrical component 50. The first electrical component 10 may be engaged between the head portion of the fastener 40 and the housing 60 of the second electrical component as shown in FIG. 2. In this manner, the first and second electrical components 10, 50 may be mechanically coupled to one another.

The fastener 40 may engage a portion of the first electronics upon mechanical connection between the first and second electrical components 10, 50. For example, the first electronics may include a deflectable portion. The deflectable portion may be configured to move relative to the first housing 20. A conductive pad may be positioned on the deflectable portion and spaced from a conductive surface of the first housing 20 by a spring member. Upon engagement of the fastener 40 with the second electrical component 50, the spring member may be compressed or expanded, and the conductive pad of the first electronics may be moved into contact with the conductive surface of the first housing 20. This may enable the first and/or second connector 30, 70 to be energized as further described below.

In one example, the fastener 40 may be configured such that the first and second electrical components 10, 50 are electrically coupled before the first and second electrical components 10, 50 may be mechanically coupled. For example, the first connector 30 may extend a greater distance from the housing 20 of the first electrical component 10 than the shaft portion of the fastener 40. In this example, the fastener 40 may be unable to engage the second opening 62 of the second electrical component 50 until the first connector 30 is engaged with the second connector 70. In other words, the fastener 40 may be too short to extend into the second opening 62 until the first connector 30 is engaged with the second connector 70. Thus, in this example, the first and second electrical components 10, 50 are electrically coupled before the first and second electrical components may be mechanically coupled.

It may be desirable for the first and second connectors 30, 70 to be completely engaged with one another (i.e., for the first and second electrical components 10, 50 to be electrically coupled to one another) prior to energizing either of the connectors. It also may be desirable for the first and second connectors 30, 70 to be deenergized prior to disengagement of the first connector 30 from the second connector 70. In an energized state, a connector may be supplied with data power and/or main power. In other words, a given terminal of an energized connector may be able to pass a low current data signal and/or a main power signal to a corresponding terminal of another connector. In a deenergized state, a connector may be supplied with the low current data signal, but may not be supplied with the main power signal. In other words, a given terminal of a deenergized connector may be able to pass the low current data signal to a corresponding terminal of another connector, but may be unable to pass the main power signal to the corresponding connector. The low current data signal may be used to determine that the first and second electrical components 10, 50 are mechanically coupled to one another as further described below. In one non-limiting example, the low current data signal may be configured as a signal having a current in the mA range (e.g., less than about 100 mA or less than about 10 mA). The main power signal may have a voltage in the range of 1-10 V, generally 3-5 V. The main power signal may be configured as direct current (DC) or alternating current (AC). Power may be supplied by, for example, an AC adapter, power over Ethernet (PoE), or any other type of power supply. The voltage supplied by the power supply may be further reduced (i.e., stepped down) by any means before being supplied to any of a variety of components or modules of an electrical component.

The first and second electrical components 10, 50 may be configured to be hot swappable or hot pluggable. In other words, the electrical components may be configured such that the first electrical component 10 may be coupled to the second electrical component 50 without powering down the first and/or second electrical components. Hot swapping may be desirable, for example, to couple one electrical component to another electrical component to add functionality to one of the electrical components without disrupting the operation of either electrical component.

Different pairs of terminals of the two connectors may come into contact with one another at different times during engagement of the connectors. For example, the second connector 70 may be oriented relative to the first connector 30 such that one end of the second connector may be received within the first connector before the other end of the second connector during engagement of the connectors. This may cause the terminals at the end of the second connector 70 received first by the first connector 30 to contact the corresponding terminals of the first connector before the terminals at the other end. If the terminals are energized during this engagement process, various portions of the electrical components may be energized at different times depending on which terminals make contact first. This may cause damage to one or both of the electrical components.

A terminal of one connector also may unintentionally contact a terminal other than the corresponding terminal of the other connector during engagement. In other words, the terminals that come into contact with one another during engagement may not be intended to contact one another. This may be caused by incorrect alignment between the two connectors during engagement. If the terminals are energized, a portion of one of the electrical components may be unintentionally powered and/or may receive a signal which that portion is not designed to receive (e.g., a data terminal may inadvertently receive a main power signal). This may cause damage to one or both of the electrical components. Thus, it may be desirable for the connectors to remain deenergized until securely engaged with one another. Similarly, it may be desirable for the connectors to be deenergized before the connectors are disengaged from one another. In other words, it may be desirable to sequence the coupling process between the two connectors such that the connectors are deenergized during engagement and/or disengagement and energized only when completely engaged with one another.

In one example, this sequencing may be achieved by including one or more shortened terminals in one or both of the connectors 30, 70. For example, a shortened terminal of the first connector 30 may have a shorter length than the other terminals of the first connector. Upon engaging the first and second connectors, the shortened terminal of the first connector may contact the corresponding terminal of the second connector only after each of the other terminals of the first connector have contacted the corresponding terminals of the second connector. The connectors may remain deenergized until the shortened terminal contacts the corresponding terminal. Thus, the connectors may remain deenergized until the last pair of terminals is coupled (i.e., until all terminals are coupled). Upon disengagement of the connectors, the shortened terminal may be uncoupled from the corresponding terminal, causing the connectors to be deenergized, while the other terminals remain coupled. Thus, the connectors may be deenergized before the first connector 30 may be disengaged from the second connector 70 or vice versa.

In another example, this sequencing may be achieved by confirming that the first and second electrical components 10, 20 are mechanically coupled to one another prior to energizing the first and/or second connectors 30, 70. To that end, the first electrical component 10 may include a coupling confirmation circuit. The coupling confirmation circuit may be open with the fastener 40 disengaged from the second electrical component 50 (e.g., with the conductive pad of the first electronics spaced from the conductive surface of the first housing 20). With the coupling confirmation circuit open, the first and second connectors 30, 70 may be deenergized. Upon engagement of the fastener 40 with the second electrical component 50, the coupling confirmation circuit may be closed (e.g., the conductive pad of the first electronics may be in contact with the conductive surface of the first housing 20). With the coupling confirmation circuit closed, the first and/or second connectors 30, 70 may be energized. In this manner, the connectors may remain deenergized until the first and second electrical components 10, 50 are mechanically coupled to one another.

Figure 3:
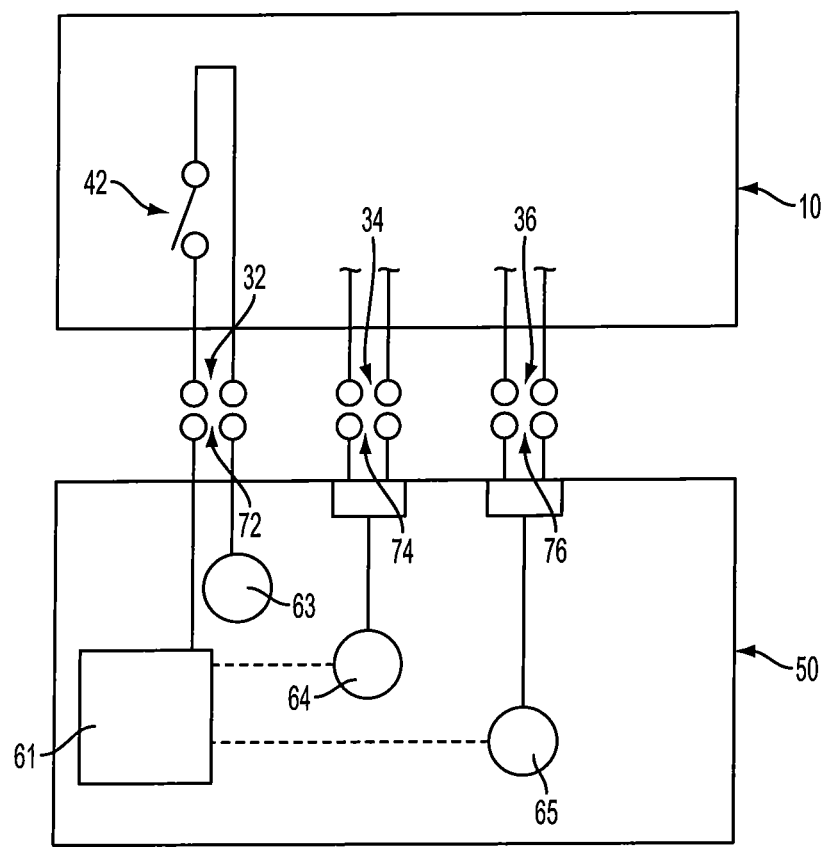
FIG. 3 illustrates one example of a coupling confirmation circuit.

FIG. 3 illustrates one example of a coupling confirmation circuit. Referring to FIGS. 1-3, a pair of terminals 32 of the first connector 30 may correspond to a pair of terminals 72 of the second connector 70. A low current confirmation data signal may be supplied across the pair of terminals 72 of the second connector 70. The conductive pad of the first electronics and the conductive surface of the first housing 20 may be configured as a switch member 42. When the conductive pad moves into contact with the conductive surface (e.g., when the first and second electrical components 10, 50 are mechanically coupled), the switch member 42 may be closed. Alternatively, the switch member 42 may be normally closed and, when the first and second electrical components 10, 50 are mechanically coupled, the switch member may open.

The coupling confirmation circuit may be a circuit including the switch member 42, the pair of terminals 32 of the first connector, the pair of terminals 72 of the second connector, and a confirmation signal supply source 63 as shown in FIG. 3. Upon actuation (e.g., opening or closing) of the switch member 42, a microprocessor 61 of the second electrical component 50 may receive the low current confirmation data signal from the signal supply source 63 via the coupling confirmation circuit. Upon receiving the low current confirmation data signal, the microprocessor 61 may initiate supply of a main power signal and/or other data signals (e.g., by transmitting a power initiation signal) to the connector 70 via the power supply source 64 and/or the data supply source 65. In other words, transmission of the power initiation signal may cause a pair of terminals 74 of the second connector to receive a main power signal to be passed to a pair of terminals 34 of the first connector 30 and/or a pair of terminals 76 of the second connector to receive a data signal to be passed to a pair of terminals 36 of the first connector. In this manner, the first electrical component 10 may be energized and able to communicate with the second electrical component 50 upon mechanical coupling of the first and second electrical components to one another. In other examples, data signals may also provide power, and separate power signals may be omitted.

In another example, the coupling confirmation circuit may be entirely contained within the first electrical component 10. For example, an energy storage device, such as a battery or a capacitor, may supply a processor in the first electrical component 10 with power such that the processor may detect activation of the switch as the low current confirmation data signal. Upon actuation of the switch member 42, the microprocessor of the first electrical component 10 may transmit a power initiation signal to the microprocessor 61. In this example, it may be unnecessary for the second electrical component 50 to supply a low current data signal to the coupling confirmation circuit because the battery may supply any signal that may be required to detect the closure of the switch 42.

In any of the examples described herein, the microprocessor 61 (or any other processor) may include a central processing unit (CPU), a graphics processing unit (GPU), or both. The processor may be a component in a variety of systems. For example, the processor may be one or more general processors, digital signal processors, application specific integrated circuits, field programmable gate arrays, servers, networks, digital circuits, analog circuits, combinations thereof, or other now known or later developed devices for analyzing and processing data. The processor may implement a software program, such as code generated manually (i.e., programmed).

The electrical components described herein may include one or more modules. The term "module" may be defined to include a plurality of executable modules. As described herein, the modules are defined to include software, hardware or some combination thereof executable by a processor, such as processor 61. Software modules may include instructions stored in memory, that is executable by the processor 61 or another processor. Hardware modules may include various devices, components, circuits, gates, circuit boards, and the like that are executable, directed, and/or controlled for performance by a processor.

The system may include a memory that can communicate via a bus. The memory may be a main memory, a static memory, or a dynamic memory. The memory may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory includes a cache or random access memory for the processor 61. In alternative examples, the memory is separate from the processor 61, such as a cache memory of a processor, the system memory, or other memory. The memory may be an external storage device or database for storing data. Examples include a hard drive, compact disc ("CD"), digital video disc ("DVD"), memory card, memory stick, floppy disc, universal serial bus ("USB") memory device, or any other device operative to store data. The memory is operable to store instructions executable by a processor. The functions, acts or tasks illustrated in the figures or described may be performed by one or more programmed processors executing the instructions stored in the memory. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

One or more modules described herein (e.g., the processors or memory) also may include a computer-readable medium in which one or more sets of instructions, e.g. software, may be embedded. The present disclosure contemplates a computer-readable medium that includes instructions or receives and executes instructions responsive to a propagated signal so that a device connected to a network can communicate voice, video, audio, images or any other data over the network. Further, the instructions may be transmitted or received over the network via a communication port or interface, and/or using a bus. The communication port or interface may be a part of a processor (e.g., microprocessor 61) or may be a separate component. The communication port may be created in software or may be a physical connection in hardware. The communication port may be configured to connect with a network, external media, or any other components described herein, or combinations thereof. The connection with the network may be a physical connection, such as a wired Ethernet connection or may be established wirelessly. Likewise, the additional connections with other components of the system may be physical connections or may be established wirelessly. The network may alternatively be directly connected to the bus.

The network may include wired networks, wireless networks, Ethernet AVB networks, or combinations thereof. The wireless network may be a cellular telephone network, an 802.11, 802.16, 802.20, 802.1Q or WiMax network. Further, the network may be a public network, such as the Internet, a private network, such as an intranet, or combinations thereof, and may utilize a variety of networking protocols now available or later developed including, but not limited to TCP/IP based networking protocols.

The computer-readable medium may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In an example, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative example, dedicated hardware implementations, such as application specific integrated circuits, programmable logic arrays and other hardware devices, can be constructed to implement various modules or parts of modules included in the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit. Accordingly, the present system encompasses software, firmware, and hardware implementations.

The system described may be implemented by software programs executable by a computer system. Further, in a non-limited example, implementations can include distributed processing, component/object distributed processing, and parallel processing. Alternatively, virtual computer system processing, such as cloud computing, can be constructed to implement various parts of the system.

By preventing the fastener 40 from engaging the second electrical component 50 until the first and second connectors 30, 70 are engaged with one another as described above, the first and second connectors may be prevented from being energized until the first and second connectors are engaged with one another. Also, upon disengagement of the fastener 40 from the second electrical component 50, the coupling confirmation circuit may be actuated, and the connectors may be deenergized. Thus, the first and second connectors also may be deenergized prior to disengagement of the first connector 30 from the second connector 70 or vice versa. Use of the coupling confirmation circuit to control the energizing and/or deenergizing of the connectors may avoid the need for custom (and perhaps expensive) connectors having terminals or pins of different lengths. The coupling confirmation circuit also may avoid the need for separate detection hardware (e.g., a plunger switch, limit switch, or proximity switch) which may be difficult to implement, especially in small form-factors.

Figure 4:
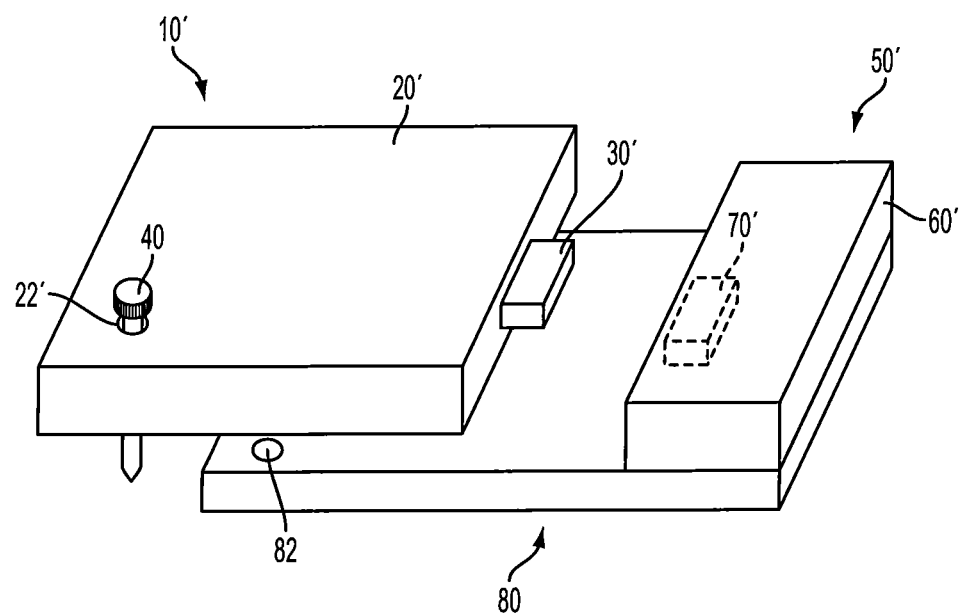
FIG. 4 illustrates a perspective view of one embodiment of a first electrical component aligned with one embodiment of a second electrical component.
Figure 5:
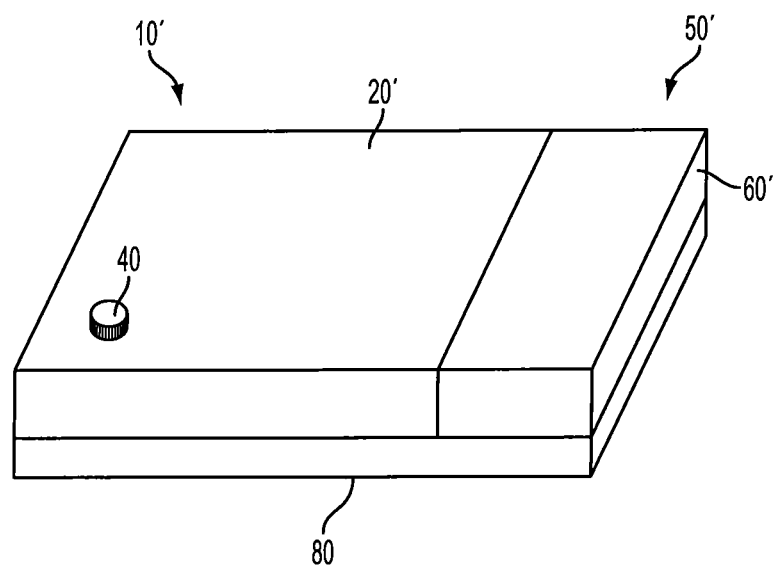
FIG. 5 illustrates a perspective view of the first electrical component of FIG. 4 coupled with the second electrical component of FIG. 4.

FIGS. 4-5 illustrate another example of the interconnection between a first electrical component 10' and a second electrical component 50'. In this example, a first connector 30' may be positioned at one end of a housing 20' of the first electrical component 10'. The second electrical component 50' may include a housing 60' and a second connector 70' configured to engage the first connector 30' of the first electrical component 10'. The second electrical component may be mounted on a support structure 80. The support structure 80 may be configured as any type of structure capable of supporting electrical components. For example, the support structure may be part of a rack for mounting electrical components. In one example, the support structure 80 may be configured as a rail or other component of a rack unit designed to hold electrical components or modules. The second connector 70' may be positioned at the end of an elongate slot bounded on one side by the support structure 80 as shown in FIG. 4. The first electrical component 10' may be positioned within the slot (e.g., by sliding the first electrical component into the slot toward the second connector 70') such that the first connector 30' is engaged with the second connector 70' and the support structure 80 is positioned generally adjacent the housing 20' of the first electrical component as shown in FIG. 4. In this manner, the first and second electrical components 10', 50' may be electrically coupled.

With the first connector 30' of the first electrical component 10' engaged with the second connector 70' of the second electrical component 50', a first opening 22' formed in the housing of the first electrical component may be aligned with a second opening 82 formed in the support structure 80. The fastener 40 may be received within the first opening 22' of the first electrical component 10' to engage the second opening 82 of the support structure 80. Secure engagement of the fastener 40 with the support structure 80 may close a coupling confirmation circuit to enable energizing of the first and/or second connectors 30', 70' as described above with reference to FIGS. 1-2.

The first and second electrical components may be configured as any type of electrical components or modules capable of electrical and/or mechanical connection to one another. For example, an electrical component may be configured as an access point, a radio module, a server, a blade server, a switch, a battery pack, or any combination thereof.

Figure 6:
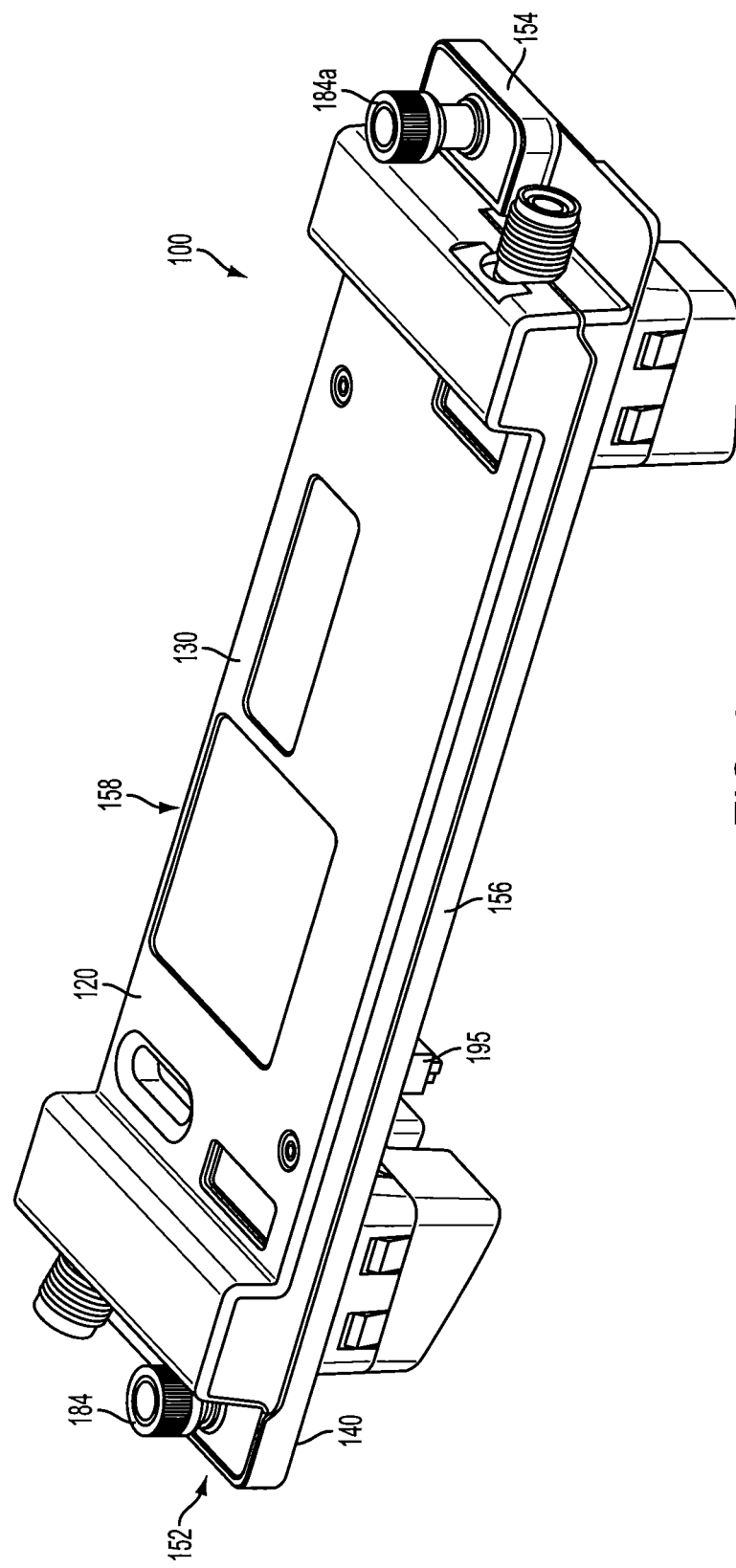
FIG. 6 illustrates a perspective view of one embodiment of a first electrical component.
Figure 7:
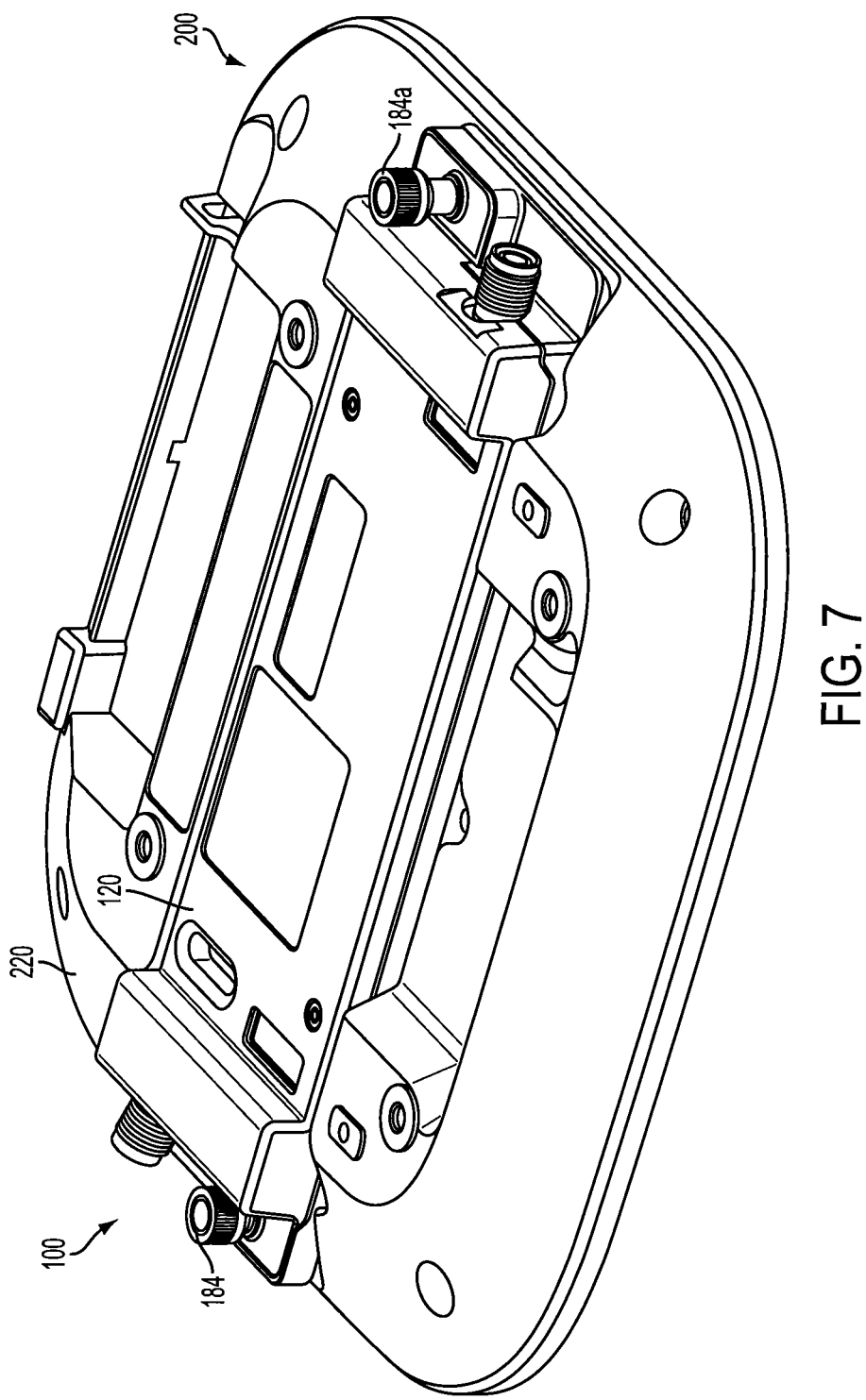
FIG. 7 illustrates a perspective view of the first electrical component of FIG. 6 coupled with one embodiment of a second electrical component.

In another example illustrated in FIGS. 6-7, a first electrical component 100 may be configured as an auxiliary module such as a radio module, and a second electrical component 200 may be configured as an access point. The access point may enable connection of various devices to a wired or wireless network. The access point may transmit data between the devices via the network to enable communication between the networked devices. The auxiliary module may be configured a radio module including one or more radios and/or antennae configured to operate in various arenas or frequencies (e.g., 2.4 GHz, 5 GHz, or any other frequency). Additionally, or alternatively, the auxiliary module may be configured to enhance the performance (e.g., range, speed, power, or other performance characteristic) of the access point. FIG. 7 illustrates the auxiliary module coupled to the access point. The auxiliary module may be electrically and/or mechanically coupled to the access point to add additional functionality to the access point.

Figure 8:
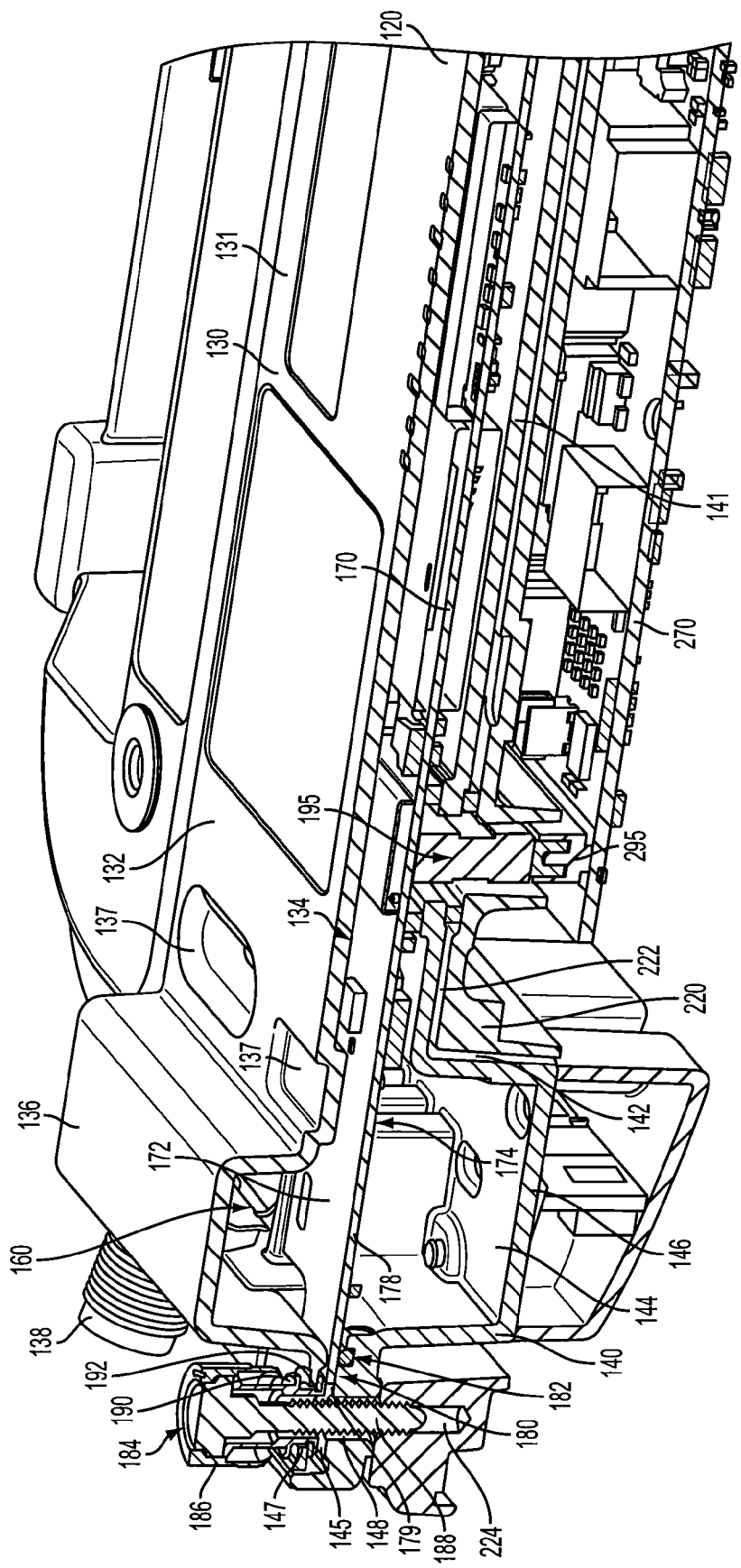
FIG. 8 illustrates a partial cross sectional view of the first electrical component coupled with the second electrical component as shown in FIG. 7.

FIG. 8 illustrates a partial cross sectional view of the first electrical component 100 coupled to the second electrical component 200 as shown in FIG. 7. Lower portions of the second electrical component 200 are omitted for clarity. The first electrical component 100 may include a housing 120. The housing 120 may include a plurality of sides cooperatively forming a cavity within the housing. To that end, the housing 120 may include a top portion 130 and a bottom portion 140. The top portion 130 may include a top plate 131 that may generally define a horizontal top side of the housing 120. The top plate 131 may be configured as a substantially planar member having an outer surface 132 and an inner surface 134. The top portion 130 also may include various surface features such as, for example, protrusions 136 and/or recesses 137 formed in the top plate 131. The surface features may be configured to have any desired size and shape. The surface features may be arranged to receive various other components of the first electrical component 100. For example, the protrusions 136 may be configured to receive cable connectors 138 and/or associated electronics.

The bottom portion 140 of the housing 120 may include a bottom plate 141 that may generally define a horizontal bottom side of the housing. The bottom plate 141 may be configured as a substantially planar member having an outer surface 142 and an inner surface 144. The bottom plate 141 also may include various surface features such as, for example, protrusions 146 and/or recesses formed therein. As shown in FIG. 6, the bottom portion 140 also may include a first housing side 152 and a second housing side 154 positioned opposite the first housing side. Similarly, the bottom portion 140 may include a third housing side 156 and a fourth housing side 158 positioned opposite the third housing side. The first and second housing sides 152, 154 may form vertical sides associated with a width of the housing 120 while the third and fourth housing sides 156, 158 may form vertical sides associated with a length of the housing 120.

The housing 120 may be configured as a box defined by the various sides thereof. For example, the housing 120 may be configured as a generally rectangular box defined by the horizontal top and bottom plates 131, 141 and the vertical sides 152, 154, 156, 158. However, the housing 120 may have any other desired shape. Additionally, the housing 120 may have an irregular shape defined by various surface features of the various sides of the housing. In other words, the generally rectangular box may include various protrusions and/or recesses corresponding to the surface features of the various sides. The vertical sides 152, 154, 156, 158 of the housing 120 may be attached to the bottom plate 141 as described above and/or the top plate 131 of the housing. Although the electrical components will be described in one particular orientation (e.g., having horizontal top and bottom plates and vertical side walls), a person having ordinary skill in the art will understand that the electrical components may be placed in any desired orientation. For example, the first electrical component 100 may be mounted such that the bottom plate 141 is positioned above the top plate 131 or such that the top and/or bottom plates are positioned vertically or at any other angle relative to a horizontal plane or to one another.

A cavity 160 may be defined within the housing 120 between the various sides of the housing. A circuit board 170 may be positioned within the cavity 160. At least a portion of the circuit board 170 may be attached to the bottom plate 141 of the housing 120. An upper surface 172 of the circuit board 170 may face the inner surface 134 of the top plate 131, and a lower surface 174 of the circuit board may face the inner surface 144 of the bottom plate 141. One or more spacers may be positioned between the circuit board 170 and the bottom plate 141 of the housing 120 at various points along a length and/or a width of the circuit board. The spacers may be configured as standoffs or separators to space the circuit board 170 from the housing 120. In this manner, the circuit board 170 may be positioned within the cavity 160 of the housing 120 such that a gap is formed between the lower surface 174 of the circuit board and the inner surface 144 of the bottom plate 141.

Figure 9:
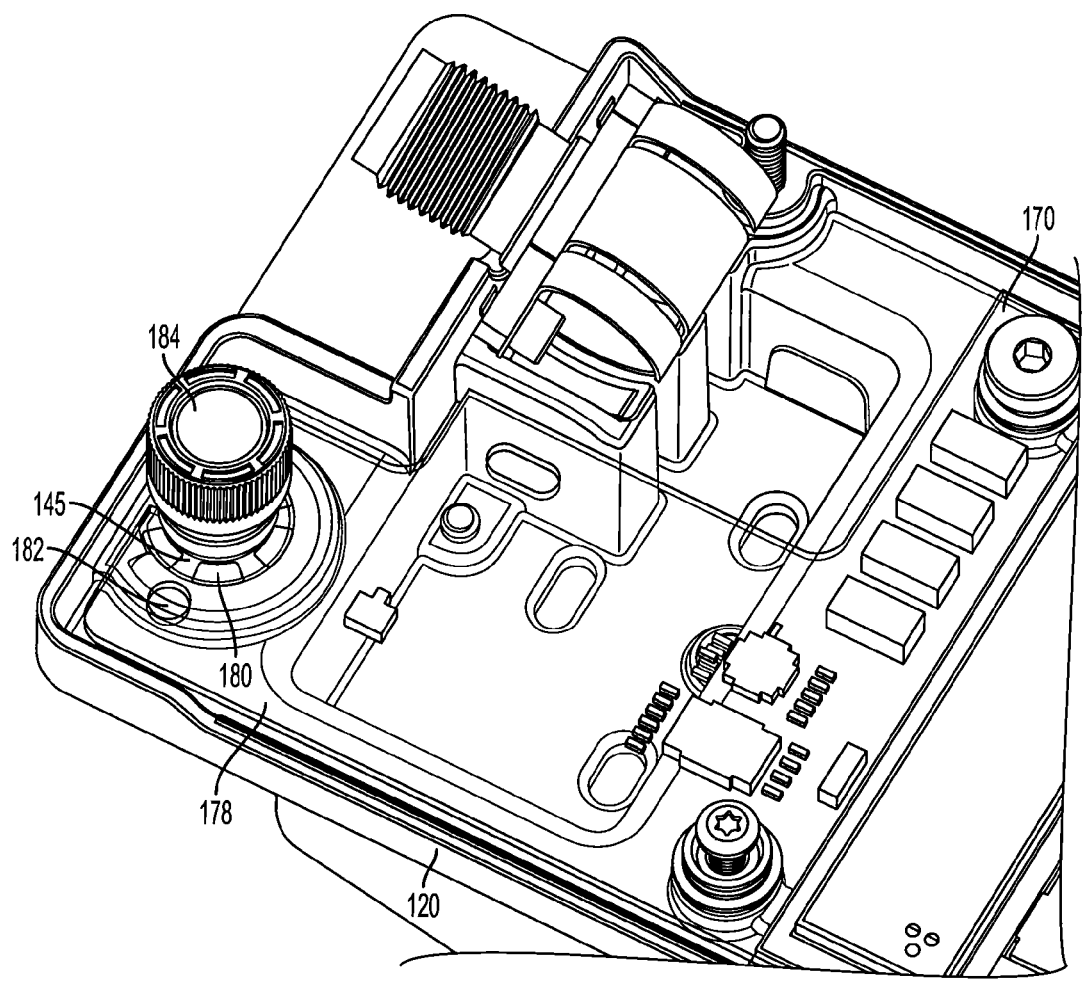
FIG. 9 illustrates a partial perspective view of the first electrical component of FIG. 6.

The circuit board 170 also may include a deflectable portion 178. FIG. 9 is a partial perspective view of the electrical component 100, with the top portion 130 of the housing removed and the circuit board 170 shown in phantom. As best shown in FIG. 9, the deflectable portion 178 may be configured as a tab or extension of the circuit board 170 that may be unattached to the housing 120 and/or generally free of any spacers. This may enable the deflectable portion 178 of the circuit board to deflect, flex, or otherwise move relative to the remainder of the circuit board. For example, the deflectable portion 178 may be capable of flexing upward and/or downward relative to the remainder (i.e., the main or supported portion) of the circuit board 170.

Returning to FIG. 8, the housing 120 may include one or more openings formed therein. For example, an opening 147 may be formed in the top plate 131 and an opening 148 may be formed in the bottom plate 141. The openings 147, 148 may be aligned with one another to form a channel through the housing 120. The openings 147, 148 also may be aligned with the deflectable portion 178 of the circuit board 170. A corresponding opening 179 may be formed in the circuit board 170. The opening 179 of the circuit board 170 may be aligned with the openings 147, 148 of the housing 120 to form a channel extending through the housing and the circuit board.

Figure 10:
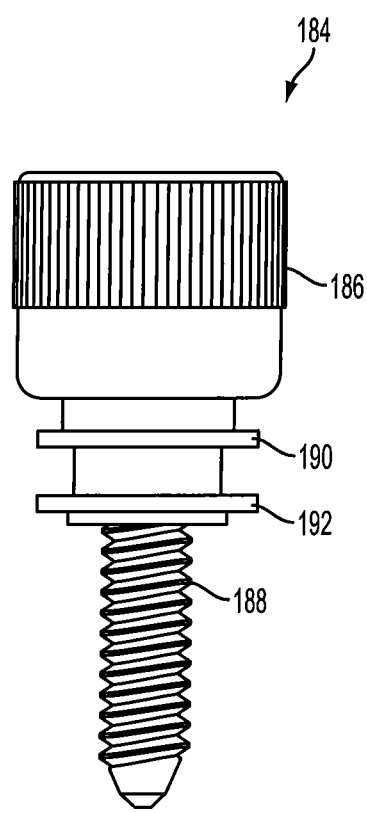
FIG. 10 illustrates a perspective view of one embodiment of a fastener.

A fastener 184 may be received in the openings 147, 148 of the housing 120 and/or the opening 179 of the circuit board 170. FIG. 10 illustrates a perspective view of one example of the fastener 184. The fastener 184 may include a head portion 186 and a shaft portion 188. In one example, the head portion 186 may include a surface feature configured to accept a tool, such as a screwdriver, for rotating the fastener. In another example, the head portion 186 may be configured for rotation by hand (i.e., without a tool). To that end, the head portion may include a textured external surface as shown in FIG. 10. The shaft portion 188 may include a series of threads extending along at least a portion thereof. The head portion 186 may be oversized relative to the openings 147, 148, 179 (e.g., the diameter of the head portion may be larger than the diameter of the openings) such that the head portion may be unable to pass through the openings. The shaft portion 188 may be sized and shaped to fit through the openings 147, 148, 179. The fastener 184 may be movable within the openings 147, 148, 179 relative to the housing 120 and/or the circuit board 170. For example, the fastener 184 may move vertically within the openings 147, 148, 179 relative to the housing 120 to engage the second electrical component 200 as further described below.

The fastener 184 may be configured as a captive fastener. To that end, the fastener 184 may include a first flange 190 and a second flange 192. The fastener 184 may be received within the openings 147, 148 of the housing 120 such that the first flange 190 is positioned external to the cavity 160 of the housing and the second flange 192 is positioned internal to the cavity 160 of the housing. For example, the fastener 184 may be received within the opening 147 such that the top plate 131 of the housing 120 is positioned between the first flange 190 and the second flange 192 along a longitudinal axis of the fastener. The second flange 192 may be positioned within the cavity 160 of the housing 120 between the circuit board 170 and the top plate 131. The flanges 190, 192 may be oversized relative to the openings 147, 148, 179 (e.g., the diameter of the flanges may be larger than the diameters of the openings) such that the flanges may be unable to pass through the openings 147, 148, 179. In this manner, the flanges may limit the range of travel of the fastener 184 relative to the housing 120.

As shown in FIGS. 8-9, the circuit board 170 also may include at least one conductive pad 180. The conductive pad 180 may be configured as a series of conductive pads positioned on the circuit board 170 as shown in FIG. 9 and further described below. The conductive pad 180 may be positioned on the lower surface 174 of the circuit board 170 between the circuit board and the bottom plate 141 of the housing 120. The conductive pad 180 may be positioned on the deflectable portion 178 of the circuit board 170. As shown in FIG. 9, the deflectable portion 178 of the circuit board 170 may be configured to extend from the remainder of the circuit board to enable the deflectable portion to move relative to the housing 120 and/or the remainder of the circuit board. The conductive pad 180 may be configured as a series of conductive pads positioned circumferentially around the opening 179 formed in the circuit board 170 as further described below. In one example, the conductive pad 180 may be positioned proximate an outside corner of the deflectable portion 178 of the circuit board. The position of the conductive pad 180 may enable the conductive pad to move relative to the housing 120 as further described below.

A region of the housing 120 corresponding to the conductive pad 180 may include a conductive surface 145. The conductive surface 145 may be positioned on the inner surface 144 of the bottom plate 141 of the housing 120. The conductive surface 145 may face the conductive pad 180 such that, upon movement of the conductive pad relative to the housing 120, the conductive pad of the circuit board 170 may be brought into contact with the conductive surface of the housing.

A spring member 182 may be positioned between the housing 120 and the circuit board 170. For example, the spring member 182 may be positioned between the inner surface 144 of the bottom plate 141 of the housing 120 and the lower surface 174 of the circuit board 170. The spring member 182 may be positioned proximate the conductive pad 180 of the circuit board 170 and/or the conductive surface 145 of the housing 120. The conductive pad 180 may be spaced from the conductive surface 145 by the spring member 182 in an expanded configuration. The spring member 182 may be compressed into a compressed configuration between the circuit board 170 and the housing 120. For example, the deflectable portion 178 of the circuit board may be moved downward toward the inner surface 144 of the bottom plate 141 of the housing 120. Such movement may overcome a spring force of the spring member 182 to compress the spring member between the lower surface 174 of the circuit board 170 and the inner surface 144 of the housing 120. In this manner, the conductive pad 180 may be moved into abutting contact with the conductive surface 145 with the spring member 182 in the compressed configuration.

In one example, the spring member 182 may be configured as an o-ring. Alternatively, or additionally, another spring member such as, for example, a wave washer, a coil spring, or a foam rubber member may be used. The o-ring may be an elastic ring member, or a portion of an elastic ring member, having an opening formed therein. The o-ring may be positioned within a groove formed along the inner surface 144 of the bottom plate 141 of the housing 120. The groove may at least partially encircle the opening 148 formed in the housing 120 such that the opening of the o-ring may be generally aligned with the opening 148 of the housing. The conductive surface 145 of the housing may correspond to the opening of the o-ring. For example, the o-ring may be positioned on the inner surface 144 of the housing 120 such that the conductive surface 145 is generally aligned with the opening of the o-ring. The conductive surface 145 may be positioned in an annular space generally between the opening 148 formed in the housing and the o-ring. Thus, the conductive surface 145 may at least partially encircle the opening 148. The conductive pad 180 may at least partially encircle the opening 179 formed in the circuit board 170 such that the conductive pad 180 also may be generally aligned with the opening of the o-ring. Alternatively, the conductive pad 180 may be configured as a series of conductive pads arranged circumferentially around the opening 179 formed in the circuit board 170. Upon compression of the o-ring into the compressed configuration, as further described below, the conductive pad 180 of the circuit board 170 may contact the conductive surface 145 of the housing 120.

In another example, the spring member may be positioned between and attached to the inner surface 134 of the top plate 131 of the housing 120 and the upper surface 172 of the circuit board 170. In the compressed configuration, the spring member may bias the deflectable portion 178 of the circuit board 170 away from the bottom plate 141 of the housing 120 so that the conductive pad 180 is spaced from the conductive surface 145. In other words, the compressed spring member may pull the deflectable portion 178 of the circuit board 170 upward away from the bottom plate 141. The spring member may be expanded (e.g., by movement of the deflectable portion 178) into an expanded configuration to enable the conductive pad 180 of the circuit board 170 to move into abutting contact with the conductive surface 145 of the housing 120.

Returning to the example shown in FIGS. 8-9, the conductive pad 180 of the circuit board 170 may be urged into contact with the conductive surface 145 of the housing 120 by the fastener 184. For example, the second flange 192 of the fastener 184 may be engaged with the upper surface 172 of the circuit board 170. The fastener 184 may be moved downward relative to the housing 120 (e.g., by threading the fastener into the second electrical component 200 as further described below). Downward movement of the second flange 192 of the fastener 184 may cause a corresponding downward movement of the deflectable portion 178 of the circuit board 170. In other words, the flange 192, in engagement with the deflectable portion 178 of the circuit board 170, may urge the deflectable portion toward the bottom plate 141 of the housing 120. Such movement may overcome the spring force or the expansive force of the spring member 182 to cause the spring member to compress and the conductive pad 180 of the circuit board 170 to move into contact with the conductive surface 145 of the housing 120. Contact between the conductive pad 180 and the conductive surface 145 may close a coupling confirmation circuit as further described below.

The first electrical component 100 may be electrically coupled to the second electrical component 200 as shown in FIG. 8. To that end, the first electrical component 100 may include a connector 195. The connector 195 may be configured to transmit data and/or power signals between the first electrical component 100 and the second electrical component 200. The connector 195 may include a connector housing and a series of terminals, each connected to the circuit board 170. The connector 195 may extend through an opening in the housing 120 to engage the second electrical component 200. The connector 195 may engage a connector 295 of the second electrical component 200, as shown in FIG. 8, to electrically couple the first and second electrical components. The connector 295 of the second electrical component 200 may include a connector housing and a series of terminals, each connected to a circuit board 270. Data and/or power signals may be transmitted through the terminals of the connector 195 of the first electrical component 100 and the connector 295 of the second electrical component 200. In this manner, data may be passed from one of the first and second electrical components 100, 200 to the other. Power also may be supplied from one of the first and second electrical components 100, 200 to the other.

The first electrical component 100 also may be mechanically coupled to the second electrical component 200. To that end, the second electrical component may include a housing 220 having an outer surface 222. The outer surface 222 of the housing 220 may be configured to correspond to the outer surface 142 of the bottom portion 140 of the housing 120 of the first electrical component 100. For example, the housing 220 of the second electrical component 200 may include various surface features that may correspond to surface features of the housing 120 of the first electrical component 100. Locator pins (not shown) also may extend from the housing of at least one of the first and second electrical components 100, 200. The locator pins may be configured to engage locator slots formed in the other of the first and second electrical components 100, 200 to ensure proper alignment between the electrical components.

An opening 224 may be formed in the housing 220 of the second electrical component 200. The first electrical component 100 may be positioned on the second electrical component 200 such that the fastener 184 of the first electrical component is generally aligned with the opening 224 of the second electrical component. The fastener 184 may be engaged with the opening 224 of the second electrical component 200 to mechanically couple the first and second electrical components to one another. To that end, the opening 224 of the second electrical component 200 may include a series of internal threads configured to engage the external threads of the fastener 184. Rotation of the fastener 184 within the opening 224 may cause the threads of the fastener to engage the threads of the opening. Such engagement may draw the fastener 184 downward into the opening 224. Such downward movement of the fastener 184 may urge the circuit board 170 toward the inner surface 144 of the bottom plate 141 of the housing 120 of the first electrical component 100. In this manner, the spring force of the spring member 182 may be overcome and the conductive pad 180 of the circuit board 170 may be moved into contact with the conductive surface 145 of the housing 120 as described above.

The fastener 184 may be configured so that the fastener may be unable to urge the circuit board 170 toward the bottom plate 141 of the housing 120 until the threads of the fastener are engaged with the threads of the opening 224. In one example, the length between the tip of the fastener 184 and the flange 192 may be slightly greater than the distance between the housing 220 of the second electrical component 200 and the upper surface 172 of the circuit board 170. Thus, in this example, the flange 192 may not engage the circuit board 170 until the threads of the fastener 184 are engaged with the opening 224 of the second electrical component (e.g., until the fastener is drawn downward into the opening 224). This may minimize bouncing of the circuit board 170 relative to the housing 120 which may cause the conductive pad 180 of the circuit board to repeatedly move into and out of contact with the conductive surface 145 of the housing.

Contact between the conductive pad 180 of the circuit board 170 and the conductive surface 145 of the housing 120 may close a coupling confirmation circuit. The coupling confirmation circuit may be configured as an electrical circuit between one or more terminals of the first connector 195 of the first electrical component 100 and corresponding terminals of the second connector 295 of the second electrical component 200. The closed coupling confirmation circuit may provide an electrical pathway between the first and second electrical components 100, 200. The first and/or second connectors 195, 295 may be deenergized when the coupling confirmation circuit is open. The first and/or second connectors 195, 295 may be energized when the coupling confirmation circuit is closed. Thus, engaging the fastener 184 with the second electrical component 200 may close the coupling confirmation circuit to enable the connectors 195, 295 to be energized. Disengaging the fastener 184 from the second electrical component 200 may open the coupling confirmation circuit to disable the connectors 195, 295 from being energized (i.e., to deenergize the connectors).

Closure of the coupling confirmation circuit may enable one device to detect and/or operate the other device. In one example, closure of the coupling confirmation circuit may enable the second electrical component 200 to recognize the presence of the first electrical component 100. This may be achieved by rebooting the second electrical component 200 upon closure of the coupling confirmation circuit. After rebooting, the second electrical component 200 may supply a power signal to the first electrical component 100 to enable operation of the first electrical component.

The fastener 184 may be configured such that the fastener may be unable to engage the second electrical component 200 until the first and second connectors 195, 295 are engaged with one another. For example, the length of the fastener 184 may be sufficiently short that the fastener may be unable to reach the opening formed in the housing 220 of the second electrical component 200 until the first connector 195 is securely engaged with the second connector 295 as shown in FIG. 8. In this manner, the first and second electrical components 100, 200 may be configured such that electrical coupling may be required before mechanical coupling may be achieved. Because the first and second connectors 195, 295 may be deenergized until the first and second electrical components 100, 200 are mechanically coupled (e.g., until the coupling confirmation circuit is closed), this may ensure that the connectors are fully engaged with one another before either of the connectors may be energized. This also may ensure that the fastener 184 is fully engaged with the second electrical component 200 (i.e., that the fastener is tightened properly) before either of the connectors may be energized. Thus, damage to the electrical components caused by engaging or disengaging the connectors while energized may be avoided.

The torque required to fully engage the fastener 184 with the second electrical component 200 may depend on the spring force or expansive force of the spring member 182. For example, the size, shape, and/or material of the o-ring may be selected to provide the o-ring with a determined durometer. A greater torque on the fastener 184 may be required to overcome the spring force of an o-ring having a greater durometer. Conversely, a lesser torque may be required to overcome the spring force of an o-ring having a lesser durometer. The o-ring may have any desired durometer. In one example, the o-ring may have a durometer of about 70. The o-ring may be configured to optimize the feedback or tactile feel experienced upon rotating the fastener 184 into engagement with the second electrical component 200. In one non-limiting example, the torque required to compress the o-ring may be about 10 lb·in.

The o-ring also may be configured to minimize bounce, or repeatedly making and breaking the contact between the conductive pad 180 and the conductive surface 145, during tightening of the fastener 184. In other words, the o-ring preferably may be soft enough that an excessive amount of torque may not be required to rotate the fastener 184 into engagement with the second electrical component 200, but hard enough that the conductive pad 180 remains spaced from the conductive surface 145 until complete engagement of the fastener with the second electrical component.

The first electrical component may include multiple fastener arrangement as described above at various locations thereon. For example, the first electrical component 100 may include a second fastener 184a as shown in FIGS. 6-7. The fastener 184a may have substantially the same configuration as the fastener 184. For example, the fastener 184a may engage a second deflectable portion of the circuit board 170. The second deflectable portion of the circuit board 170 may be located generally opposite the deflectable portion 178 (e.g., at an opposite corner of the circuit board). The second deflectable portion of the circuit board may include a second conductive pad which may be separated from a second conductive surface of the housing by a second spring member. The second fastener 184a may engage a second opening formed in the second electrical component 200 to compress the second spring member and move the second conductive pad into contact with the second conductive surface as described above. This may close a second coupling confirmation circuit. The structure and operation of these components may be substantially the same as the corresponding components described above.

In one example, both the fastener 184 and the fastener 184a may be completely engaged with the respective openings of the second electrical component 200 to mechanically couple the first and second electrical components to one another. The two coupling confirmation circuits may be independent of one another. The first and second connectors 195, 295 may be energized upon closing of one or both of the independent coupling confirmation circuits. Mechanical coupling of the first and second electrical components 100, 200 to one another may be ensured prior to energizing the first and/or second connectors 195, 295.

The first electrical component 100 may include any number of coupling confirmation circuits which may be opened and/or closed as described above. To that end, any number of fasteners may be located at any location along the first electrical component 100. The various components described above also may be positioned within the second electrical component 200 instead of or in addition to the first electrical component 100. Such rearrangement or modification of the components described herein is within the scope of this disclosure.

The first electrical component may be coupled to the second electrical component in the following manner. The first electrical component 100 may be generally aligned with the second electrical component 200 such that the first connector 195 may be aligned with the second connector 295 and the fastener 184 may be aligned with the opening 224. The first electrical component 100 may be lowered toward the second electrical component to engage the first connector 195 with the second connector 295. The first electrical component 100 may be lowered onto the second electrical component 200 until the first and second connectors 195, 295 are completely and/or securely engaged with one another. The first and second electrical components 100, 200 may be electrically coupled upon engagement of the first and second connectors 195, 295. Because the coupling confirmation circuit may be open, the first and second connectors may remain deenergized. Thus, the first and/or second electrical components may not detect one another upon electrical coupling.

The fastener 184 may be lowered into contact with the opening 224 of the second electrical component 200. Torque may be applied to the head portion 186 of the fastener 184 to rotate the fastener within the opening 224. Upon rotation of the fastener 184, the threads of the fastener and the threads of the opening 224 may engage one another to draw the fastener into the opening. This may cause the fastener 184 to move downward with respect to the housing 120 and/or the circuit board 170. Downward movement of the second flange 192 of the fastener 184 may cause a corresponding downward movement of the deflectable portion 178 of the circuit board 170. Such movement may cause the conductive pad 180 of the circuit board 170 to move downward toward the conductive surface 145 of the housing 120. The fastener 184 may be threaded into the opening 224 until the spring member 182 is compressed and the conductive pad 180 is in contact with the conductive surface 145. The first and second electrical components 100, 200 may be mechanically coupled to one another upon complete engagement of the fastener 184 with the opening 224 of the second electrical component. Upon mechanical coupling, the coupling confirmation circuit may be closed. Closing the coupling confirmation circuit may cause the first and/or second connectors 195, 295 to be energized. In one example, closing the coupling confirmation circuit may cause one or both of the first and second electrical components to reboot. For example, the second electrical component may reboot, which may enable the second electrical component to recognize the presence of the first electrical component. Upon rebooting, data and/or power signals may be transmitted between the first and second electrical components via the connectors.

The first electrical component 100 may be decoupled from the second electrical component 200 in the following manner. Torque may be applied to the fastener 184 to urge the fastener out of the opening 224 of the second electrical component. The fastener 184 may be moved upward relative to the housing 120 of the first electrical component 100. Upon such upward movement, the spring force of the spring member 182 may urge the deflectable portion 178 of the circuit board 170 upward relative to the housing 120. Such upward movement of the deflectable portion 178 may cause the conductive pad 180 to move out of contact with the conductive surface 145 of the housing 120. This may open the coupling confirmation circuit, which may deenergize the first and/or second connectors 195, 295. The first and second connectors 195, 295 may remain engaged with one another upon opening of the coupling confirmation circuit. The fastener 184 may be completely disengaged from the opening 224 of the second electrical component 200 (e.g., the fastener 185 may be removed from the opening 224). The first electrical component 100 then may be lifted away from the first electrical component 200, which may cause the first and second connectors 195, 295 to disengage one another. Because the coupling confirmation circuit may be opened prior to disengagement of the connectors, the connectors may be deenergized during disengagement.

Various embodiments described herein can be used alone or in combination with one another. The foregoing detailed description has described only a few of the many possible implementations of the present invention. For this reason, this detailed description is intended by way of illustration, and not by way of limitation.

The invention claimed is:

1. An apparatus comprising:
    a housing comprising a conductive surface;
    a circuit board comprising a deflectable portion and a conductive pad coupled with the deflectable portion; and
    a spring member positioned between the housing and the circuit board, the conductive pad of the circuit board being spaced away from the conductive surface of the housing by the spring member in a first configuration, the conductive pad of the circuit board being in contact with the conductive surface of the housing with the spring member in a second configuration.

2. The apparatus of claim 1, further comprising a fastener having a flange, wherein the flange is engaged with the deflectable portion of the circuit board.

3. The apparatus of claim 2, wherein the fastener extends through an opening formed in the circuit board and a corresponding opening formed in the housing, the conductive pad comprising a series of conductive pads at least partially encircling the opening formed in the circuit board, and the conductive surface at least partially encircling the opening formed in the housing.

4. The apparatus of claim 2, wherein the spring member at least partially encircles the fastener.

5. The apparatus of claim 1, wherein the deflectable portion of the circuit board is movable relative to the housing to move the conductive pad relative to the conductive surface.

6. The apparatus of claim 1, wherein the spring member comprises an o-ring and the first configuration is an expanded configuration and the second configuration is a compressed configuration.

7. The apparatus of claim 1, further comprising a coupling confirmation circuit, wherein the coupling confirmation circuit is closed by contact of the conductive pad with the conductive surface.

8. A system comprising:
    a first electrical component comprising a first housing having an opening formed therein and a conductive surface, a circuit board having a conductive pad, and a first connector, a spring member positioned between the first housing and the circuit board, the spring member being movable between a first configuration and a second configuration, the conductive pad of the circuit board and the conductive surface of the first housing being spaced from one another by the spring member in the first configuration and in abutting contact with one another with the spring member in the second configuration;
    a second electrical component comprising a second connector and a second housing having an opening formed therein, the first and second housings being structured and arranged such that, with the first and second connectors engaged with one another, the opening of the first housing is aligned with the opening of the second housing; and
    a fastener extending through the opening of the first housing and movable into an engaged position in which a portion of the fastener is engaged with the opening of the second housing to move the spring member into the second configuration.

9. The system of claim 8, further comprising a coupling confirmation circuit, the coupling confirmation circuit being in an open state with the conductive pad spaced from the conductive surface, the coupling confirmation circuit being in a closed state with the conductive pad in contact with the conductive surface.

10. The system of claim 9, wherein each of the first and second connectors is deenergized with the coupling confirmation circuit in the open state and at least one of the first and second connectors is energized with the coupling confirmation circuit in the closed state.

11. The system of claim 8, wherein the fastener is structured and arranged such that, until the first and second connectors are aligned and engaged with one another, the fastener is unable to engage the opening of the second housing.

12. The system of claim 8, wherein the spring member is biased toward the expanded configuration to space the conductive pad from the conductive surface.

13. The system of claim 8, wherein the circuit board further comprises a deflectable portion configured to move relative to the first housing and the conductive pad is positioned on the deflectable portion of the circuit board to be movable relative to the conductive surface of the first housing.

14. The system of claim 13, wherein the fastener further comprises a flange, the flange being engaged with the deflectable portion of the circuit board.

15. The system of claim 8, wherein the fastener extends through an opening formed in the circuit board and the opening formed in the first housing, the conductive pad comprising a series of conductive pads at least partially encircling the opening formed in the circuit board, and the conductive surface at least partially encircling the opening formed in the first housing.

16. The system of claim 8, wherein the first electrical component is a radio module and the second electrical component is an access point.

17. A method comprising:
  electrically coupling a first electrical component to a second electrical component by engaging a first connector of the first electrical component with a second connector of the second electrical component, each of the first and second connectors being deenergized; and
  energizing at least one of the first and second connectors subsequent to electrically coupling the first and second electrical components by moving a spring member of the first electrical component between a first configuration and a second configuration, the spring member being positioned between a circuit board of the first electrical component and a housing of the first electrical component, a conductive pad of the circuit board and a conductive surface of the housing being spaced from one another with the spring member in the first configuration and in contact with one another with the spring member in the second configuration.

18. The method of claim 17, wherein moving the spring member further comprises engaging the circuit board with a flange of a fastener and engaging an opening of the second electrical component with the fastener to draw at least a portion of the circuit board closer to the second electrical component.

19. The method of claim 17, further comprising:
  deenergizing each of the first and second connectors by moving the spring member between the first configuration and the second configuration; and
  electrically decoupling the first electrical component from the second electrical component subsequent to deenergizing each of the first and second connectors by disengaging the first connector of the first electrical component from the second connector of the second electrical component.

20. The method of claim 17, wherein the first electrical component is a radio module and the second electrical component is an access point.

* * * * *